(12) United States Patent
Obrejanu

(10) Patent No.: US 7,806,669 B2
(45) Date of Patent: Oct. 5, 2010

(54) PUMP FOR PUMPING FLUIDS

(75) Inventor: Marcel Obrejanu, Calgary (CA)

(73) Assignee: Star Oil Tools Inc., Calgary, Alberta (CA)

( * ) Notice: Subject to any disclaimer, the term of this patent is extended or adjusted under 35 U.S.C. 154(b) by 298 days.

(21) Appl. No.: 11/089,641

(22) Filed: Mar. 25, 2005

(65) Prior Publication Data
US 2006/0216162 A1    Sep. 28, 2006

(51) Int. Cl.
F04B 35/00 (2006.01)
E21B 43/00 (2006.01)
B01D 19/00 (2006.01)

(52) U.S. Cl. .............. 417/409; 417/423.1; 96/195; 166/54.1; 166/105.5

(58) Field of Classification Search .......... 95/261; 166/105.5, 54.1, 265; 417/423.1, 313, 409; 96/195, 155, 261
See application file for complete search history.

(56) References Cited

U.S. PATENT DOCUMENTS

| | | | | |
|---|---|---|---|---|
| 4,215,976 A | * | 8/1980 | Neumann | 417/409 |
| 5,547,350 A | | 8/1996 | Rawal et al. | |
| 5,575,628 A | | 11/1996 | Caldwell | |
| 5,700,138 A | * | 12/1997 | Bevington | 417/366 |
| 5,944,999 A | * | 8/1999 | Chancellor et al. | 210/650 |
| 6,120,261 A | * | 9/2000 | Al-Towailib | 417/356 |
| 6,149,393 A | * | 11/2000 | Chancellor | 417/53 |
| 6,364,940 B1 | * | 4/2002 | Prueter et al. | 95/261 |
| 6,557,642 B2 | | 5/2003 | Head | |
| 6,601,651 B2 | | 8/2003 | Grant | |
| 6,827,820 B1 | * | 12/2004 | Meinander | 162/189 |

FOREIGN PATENT DOCUMENTS

WO    WO 98/35135 A1    8/1998

OTHER PUBLICATIONS

Direct Drive Motors allows large through holes.—Applimotion, Inc. http://www.industrialnewsroom.com/fullstory/9484 Jul. 29, 2004 pp. 1-3.
Rotary Motors provide complete speed/torque solution.—Kollmorgen http://www.industrialnewsroom.com/fullstory/24849 Jun. 15, 2004. pp. 1-8.
Burton Corblin *Rotary Periflow Compressors*, Compression technology at your service pp. 1-8.

* cited by examiner

*Primary Examiner*—Devon C Kramer
*Assistant Examiner*—Leonard J Weinstein
(74) *Attorney, Agent, or Firm*—Cohen Pontani Lieberman & Pavane LLP

(57) ABSTRACT

A pump is disclosed which has a housing with a upper end and a lower end. A conduit is defined through the housing between the upper and the lower ends. The pump includes an impeller within the housing, an inlet from the conduit to the impeller and an outlet from the impeller. Portions of the impeller may be distributed around the conduit. The pump may also include a motor coupled to the impeller. Portions of motor may also be distributed around the conduit. The outlet from the impeller may be independent of the conduit.

9 Claims, 7 Drawing Sheets

PUMP FOR PUMPING FLUIDS

FIELD OF THE INVENTION

This invention relates to pumps for pumping fluid, and more particularly but not limited to gas compressors for use at the wellhead of an oil or gas well.

BACKGROUND OF THE INVENTION

The structure in a wellbore of an oil or gas well generally consists of an outer production casing and inner production tubing installed inside the production casing. The space between the production tubing and the casing is generally referred to as the annular space.

Oil and gas wells generally produce both liquids and gas. The produced liquids are produced through production tubing installed in the wellbore. The production casing can be used to introduce downhole equipment or other fluids into the wellbore. The annular space allows for free gas to be separated from the produced liquids and provides a conduit for the gas to flow to surface.

For wells that produce both liquid and gas, a pump positioned at the bottom of the well pumps the produced liquids to the surface through the production tubing. The pump is typically a liquid pump and any amount of gas that is produced through the pump reduces its efficiency and can damage the pump. Rather than the gas being pumped up through the production tubing, the gas is allowed to flow to surface through the annular space. If a gas well does not produce liquids (or only small amounts of liquids), then gas can be produced up the production tubing.

As the free gas accumulates in the annular space, it increases in pressure and can negatively influence the production of the well. To deal with this problem, some oil well wellhead installations have a system for venting or for burning off the gas, which has been produced. However, the venting or the burning of the gas is a waste of this resource and can cause undesirable environmental problems.

A second option is to provide a connection from the annular space to a gas compressor to direct the gas out of the annular space. Know gas compressors are skid mounted units installed in proximity to the wellhead assembly and connected to the wellhead assembly through piping. A problem with known gas compression systems is that they can be bulky. The space available for the wellhead assembly is often limited. The addition of a compressor to a surface assembly will increase the footprint of the well and can result in a surface assembly which is too large for the available space.

SUMMARY OF THE INVENTION

According to one broad aspect, the invention provides a pump for pumping fluid comprising: a conduit for carrying fluid, a fluid displacer means positioned externally of the fluid conduit and having a plurality of portions which are arranged to act on fluid at different positions about the fluid conduit, means for introducing fluid to the fluid displacer means to be pumped thereby and means for directing pumped fluid from the fluid displacer.

In some embodiments, the fluid dispenser means comprises an impeller.

In some embodiments, the pumped fluid is directed external to the conduit.

In some embodiments, the fluid displacer means is substantially uniformly distributed around the conduit.

In some embodiments, an axis of rotation of the impeller is within the conduit.

In some embodiments, the pump further comprises a motor coupled to the fluid displacer means and positioned externally of the fluid conduit, the motor including a rotor wherein the rotor is positioned to rotate about the fluid conduit.

In some embodiments the motor is directly coupled to the fluid displacer means.

According to one broad aspect, the invention provides a pump for pumping fluid comprising: a conduit for carrying fluid, a fluid displacer means positioned externally of the fluid conduit and having a plurality of portions which are arranged to act on fluid, means for introducing fluid to the fluid displacer means to be pumped thereby, and means for directing pumped fluid from the fluid displacer external to the conduit.

In some embodiments, the means for introducing fluid to the fluid displacer is an internal bore.

In some embodiments, the conduit comprises a central bore.

In some embodiments, the pump further comprises a sleeve defining at least part of the conduit and separating the conduit from the fluid displacer means.

In some embodiments, the pump is adapted to mate with a wellhead casing and the central bore comprises a segment of the wellhead casing.

In some embodiments, the pump is adapted to mate with a pipeline and the central bore comprises a segment of the pipeline.

In some embodiments, the pump further comprises a second fluid displacer means wherein fluid is directed from the fluid displacer means to the second fluid displacer means.

In some embodiments, portions of the pump comprising the fluid displacer means are modular.

In some embodiments, the pump further comprises a motor wherein the motor is modular.

Another broad aspect of the invention provides a motor for use with a fluid conduit, the motor including a rotor wherein the rotor is positioned to rotate about the fluid conduit.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
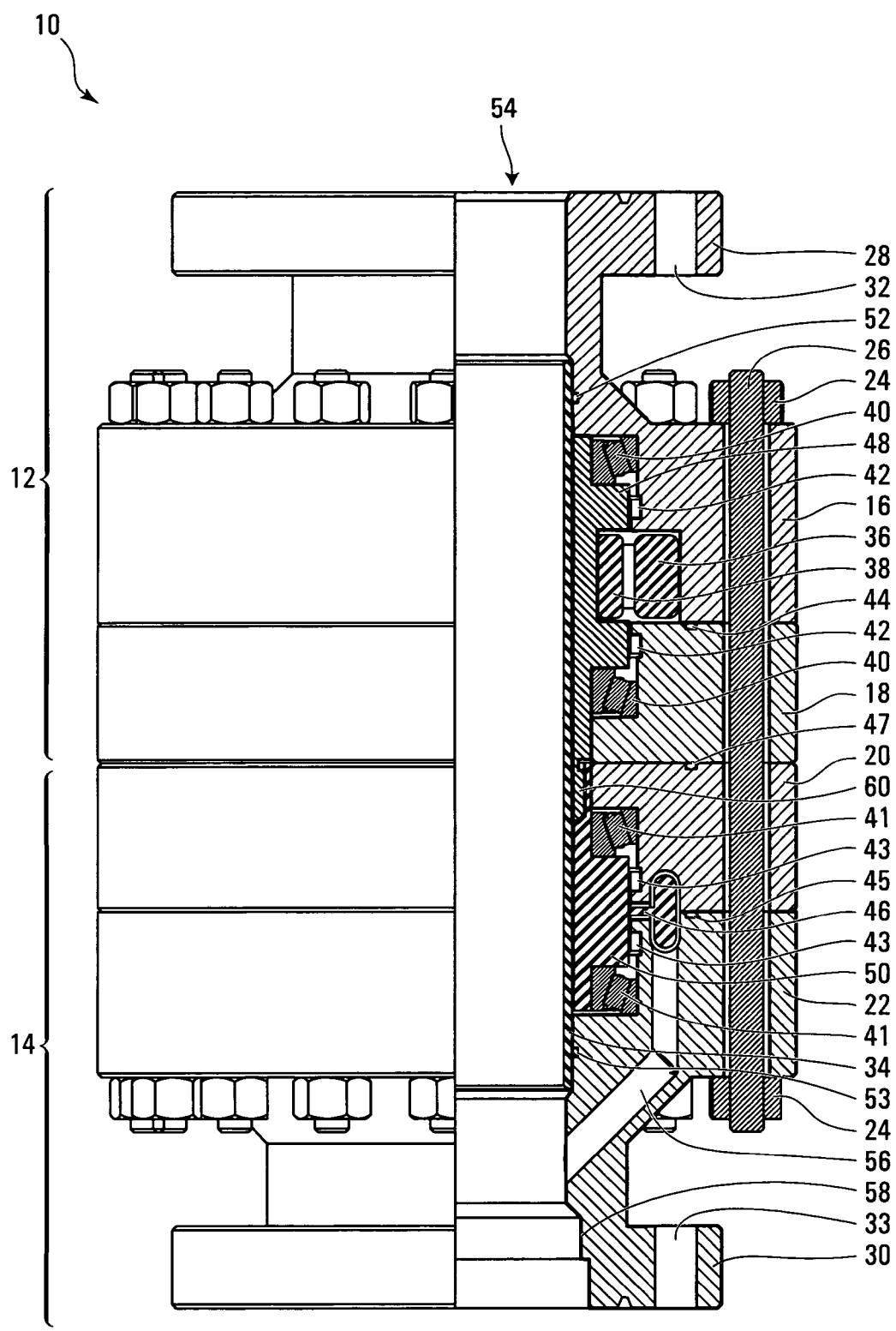
FIG. 1 is a side inlet partial section view of an embodiment of the invention.
Figure 2:
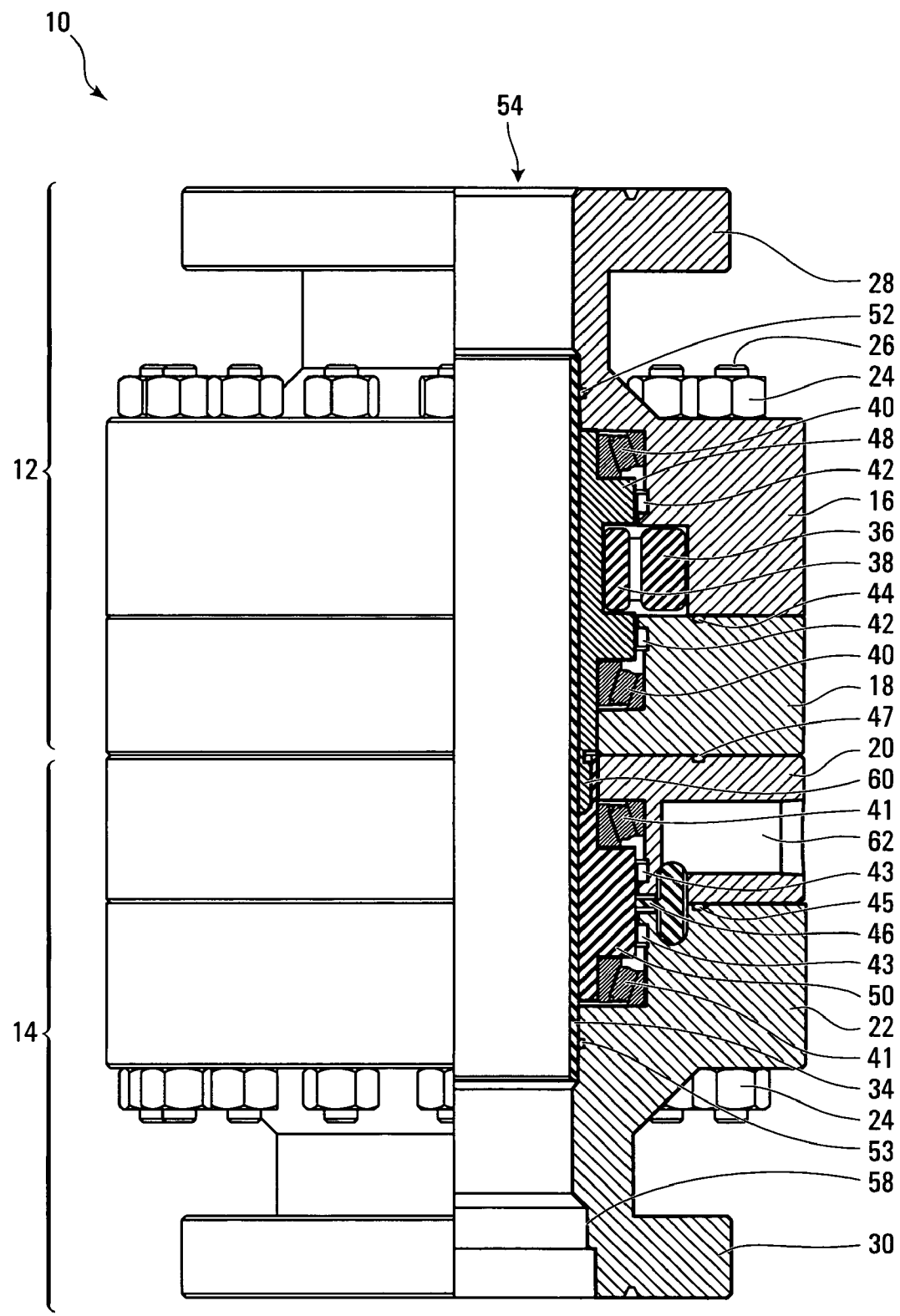
FIG. 2 is a side outlet partial sectional view of the embodiment of FIG. 1.

FIG. 1 shows a pump, also know as a gas compressor 10, according to the invention. The pump has a housing with a upper end and a lower end as seen in FIGS. 1 and 2. A conduit is defined by a through bore 54 through the housing between the upper and the lower ends. The pump includes a fluid dispenser, in the form of an impeller 46 external to the conduit, a means for introducing fluid to the impeller, in the form of an inlet 56 from the conduit to the impeller, and a means for directing fluid from the impeller, in the form of an outlet 62 from the impeller. A plurality of portions of the fluid dispenser may be arranged around the conduit to act on fluid at different positions about the conduit. The pump may also include a motor coupled to the impeller. The motor may be directly coupled to the pump (i.e. without a transmission). A rotor of the motor may also be positioned to rotate around the conduit. The outlet from the impeller may be independent of the conduit.

More particularly, FIG. 1 shows the gas compressor 10 which is comprised of power section 12 which makes up the upper portion of the gas compressor 10 and a compressor section 14 which makes up the lower portion of the gas compressor 10. The power section 12 has two housing components, an upper power housing 16 and a lower power housing 18. Similarly, the compressor section 14 has two housing components, an upper compressor housing 20 and a lower compressor housing 22. The power section 12 is made up of two power housings 16, 18 and the compressor section 14 is made up of two compressor housings 20, 22 primarily for manufacturing, service and assembly purposes. The housings may alternatively be manufactured in one piece or other numbers of pieces.

The upper power housing 16, the lower power housing 18, the upper compressor housing 20 and the lower compressor housing 22 are vertically aligned. Bolt holes are defined vertically through the upper power housing 16, the lower power housing 18, the upper compressor housing 20 and the lower compressor housing 22 around the perimeter. These bolt holes are aligned so that long studs 26 can extend through the bolt holes of all four housing 16, 18, 20 and 22. Nuts 24 are screwed to the top and the bottom of the long studs 26 to hold the housings 16, 18, 20 and 22 together. An upper flange 28 is provided at the top of the upper power housing 16. Bolt holes 32 are defined vertically through the upper flange 28 and are spaced around the perimeter of the upper flange 28. Similarly, a lower flange 30 is provided at the bottom of the lower compressor housing 22. Bolt holes 33 are defined vertically through the lower flange 30 around the perimeter of the lower flange 30. Other fastening means for interconnecting the housing components may alternatively be used. Rather than being flanged, the ends of the gas compressor 10 may be threaded or provided with other fastening means.

The through bore 54 extends vertically through the center of the gas compressor 10. Other gas flow path shapes and locations may alternatively be provided. In this embodiment, the through bore 54 is advantageously sized to match the internal diameter of a well casing and the lower compressor housing 22 defines a casing shoulder 58 to accommodate the exterior of the casing when the gas compressor 10 is mounted on a wellhead.

A sleeve 34 is provided on an interior of the gas compressor 10. The sleeve 34 comprises a hollow tube with an interior dimension sized to be the same as the interior of the well casing. The sleeve 34 sits within a recess defined in the housings 16, 18, 20 and 22. This allows for the through bore 54 to have a uniform diameter through the sleeve 34.

A top seal 52 and a bottom seal 53 are provided adjacent the top and the bottom of the sleeve 34 respectively. The top seal 52 provides a seal between the sleeve 34 and the upper power housing 16. The bottom seal 53 provides a seal between the lower compressor housing 22 and the sleeve 34. The seals 52 and 53 and the sleeve 34 isolate the through bore 54 from the interior of the power section 12 and the compressor section 14. The sleeve advantageously provides isolation of moving parts of the impeller and motor from the annular space and from equipment being run in and out of the well. However, in some embodiments, the sleeve may not be present, may have a different diameter than the bore 54 or may not extend the entire length of the moving parts of the impeller and the motor.

Internal to the power section 12, is a power mandrel 48. The power mandrel 48 is rotably held within the power section 12. Taper roller bearings 40 are provided at the top and bottom of the power mandrel 48. The taper roller bearings 40 rotably support the power mandrel 48. The taper roller bearings 40 are surrounded by lubricant to enable smooth rotation of the power mandrel 48.

The power section 12 also includes the motor comprised of the rotor 38 and a stator in the form of field windings 36. The rotor 38 is fastened around the outer circumference of the power mandrel 48. The field windings 36 are fastened to an inner circumference of the upper power housing 16. The field windings 36 and the rotor 38 are vertically aligned. The field windings 36 and the rotor 38 are centered between the taper roller bearings 40 of the power section 12. Seals 42 are provided between the taper roller bearings 40 and the field windings 36 and the rotor 38. The seals 42 prevent the lubricant surrounding the taper roller bearings 40 from entering the area of the field windings 36 and the rotor 38.

External power is provided (not shown) to power the field windings 36 to provide power to the power section 12. The field windings 36 and the rotor 38 together form a motor for driving the gas compressor 10. Other motor configurations may alternatively be used (i.e. a hydraulic motor).

A Seal 44 is also provided between the upper power housing 16 and the lower power housing 18. The seal 44 seals the field windings 36 and the rotor 38 from external contaminants.

The compressor section 14 is provided with a compressor mandrel 50. Taper roller bearings 41 are provided at the top and bottom of the compressor mandrel 50 as with the power mandrel 48. The taper roller bearings 41 rotably support the compressor mandrel 50. The taper roller bearings 41 are surrounded by lubricant to enable smooth rotation of the compressor mandrel 50.

The compressor section 14 is also provided with the impeller 46. The impeller 46 is attached radially outward from the compressor mandrel 50. A circumferential space is defined through the compressor section 14 and the impeller 46 occupies this space. The impeller 46 is comprised of a series of protrusions which, when rotated about a vertical axis of the gas compressor 10, pump the gas through the space.

The impeller 46 is isolated from the lubricant surrounding the taper roller bearings 41 of the compressor section 14 by seals 43. A seal 45 is provided to seal the upper compressor housing and the lower compressor housing 20 from the exterior of the gas compressor 10 to prevent gas leakage. A seal 47 is provided between the lower power housing 18 and the upper compressor housing 20. The seal 47 contains a lubricant and prevents contamination from outside.

The inlet 56 is provided which connects the through bore 54 to the circumferential space occupied by the impeller 46. A first portion of the inlet 56 is angled upwardly to the through bore 54 and a second section of the inlet 56 is vertical. The inlet 56 is generally tubular in shape. The inlet 56 enables direct suction to the impeller 46 without the need for external piping.

A top extension of the compressor mandrel 50 and a lower extension of the power mandrel 48 overlap around the circumference of gas compressor 10. The overlapping extensions of the power mandrel 48 and the compressor mandrel 50 contain mating splines 60 which allow the power mandrel 48 and the compressor mandrel 50 to be slid together and held securely. The power mandrel 48 and the compressor mandrel 50 are thereby directly coupled without the use of a transmission. Other coupling means may alternatively be used. Advantageously, the compressor mandrel and the power mandrel in the embodiment of FIG. 1 are coupled axially to rotate about the same rotational axis which extends through the bore 54.

FIG. 2 shows a partial section of the gas compressor 10 rotated about the vertical axis in relation to the section shown in FIG. 1 so that the outlet 62 from the impeller 46 is shown. The outlet 62 is a circular orifice extending outwardly laterally from the impeller 46. The relative positions of the outlet 62, the inlet 56 and the impeller 46 can be seen more clearly in FIG. 3.

In operation, the compressor 10 is placed in line at the top of a casing head of a production well. The through bore 54 is aligned with the casing sitting in the shoulder 58. The power section 12 and in particular the field windings 36 power the rotor 38. The rotor 38 rotates about an axis of the through bore 54 to rotate the power mandrel 48. The power mandrel 48 is coupled to the compressor mandrel 50 by splines 60. The compressor mandrel 50 rotates at the same speed as the power mandrel 48. The rotation of the compressor mandrel 50 causes the impeller 46 to also rotate. Gas which enters the inlet 56, is pumped by the impeller 46 in the direction A (see FIG. 3) around the circumference of the compressor 10 and exits through the outlet 62.

Figure 4:
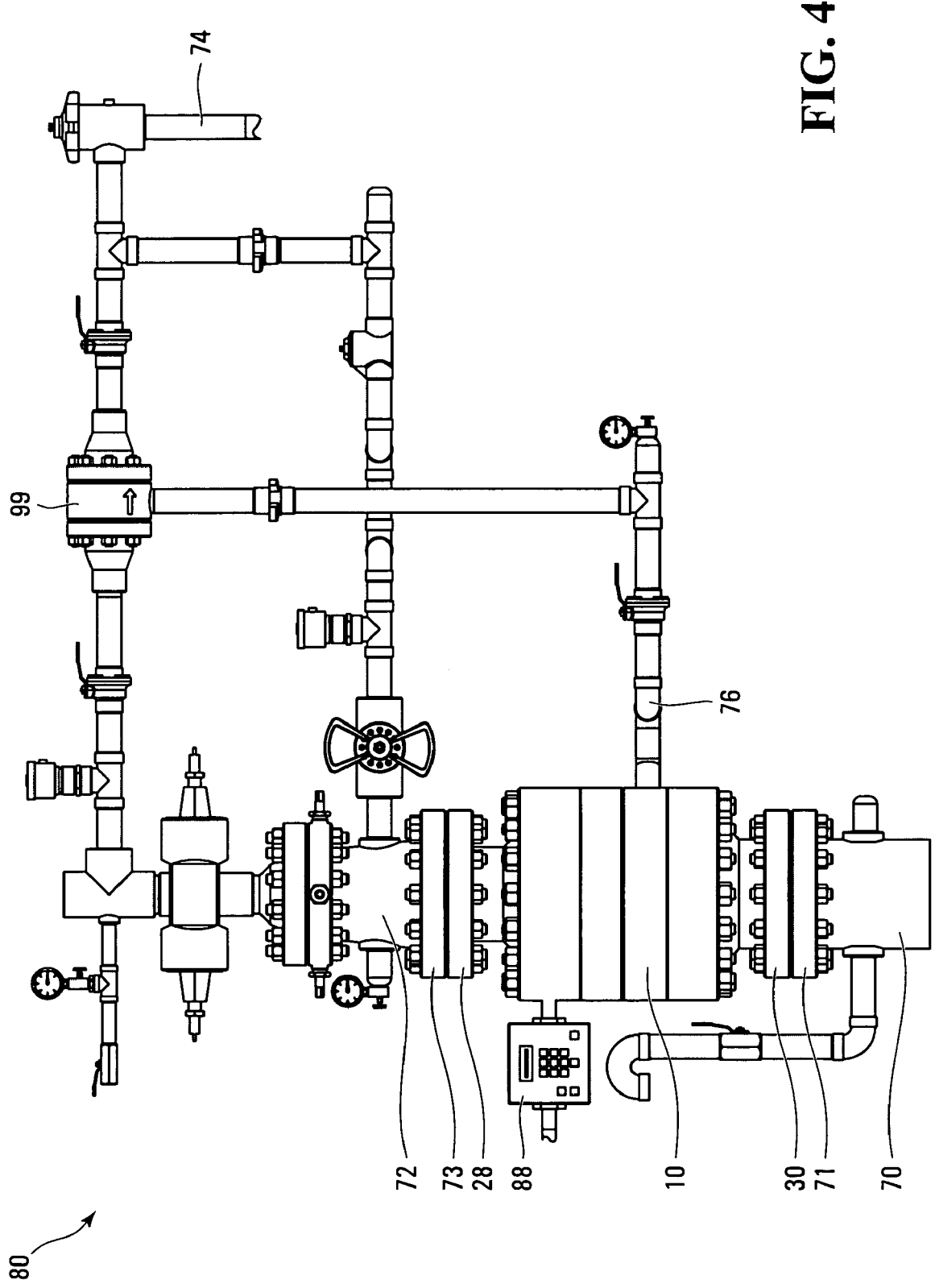
FIG. 4 is a schematic view of the embodiment of FIG. 1 shown as part of a wellhead assembly.

The gas compressor 10 is shown in FIG. 4 assembled as part of a wellhead assembly 80. The lower flange 30 of gas compressor 10 is bolted to the upper flange 71 of the casing head 70. At an upper end of the gas compressor 10, the upper flange 28 is bolted to a flange 73 of a tubing head 72. The outlet 62 of the compressor 10 connects to a casing line 76. In the configuration shown in FIG. 4, the casing line 76 is connected to the main flow line 74 through a jet pump 99 such that both the production fluid and the casing gas may be pumped together. A variable frequency drive controller 88 provides and regulates the power to the gas compressor 10.

The gas compressor 10 acts as a segment of the wellhead casing. The production tubing can extend through the gas compressor 10. The gas compressor 10 allows gas to be removed from the annular space without restricting the production casing so that tools can be run in and out of the well and production stimulation fluid can be pumped through the annular space defined by the bore 54 through the gas compressor 10.

Figure 3:
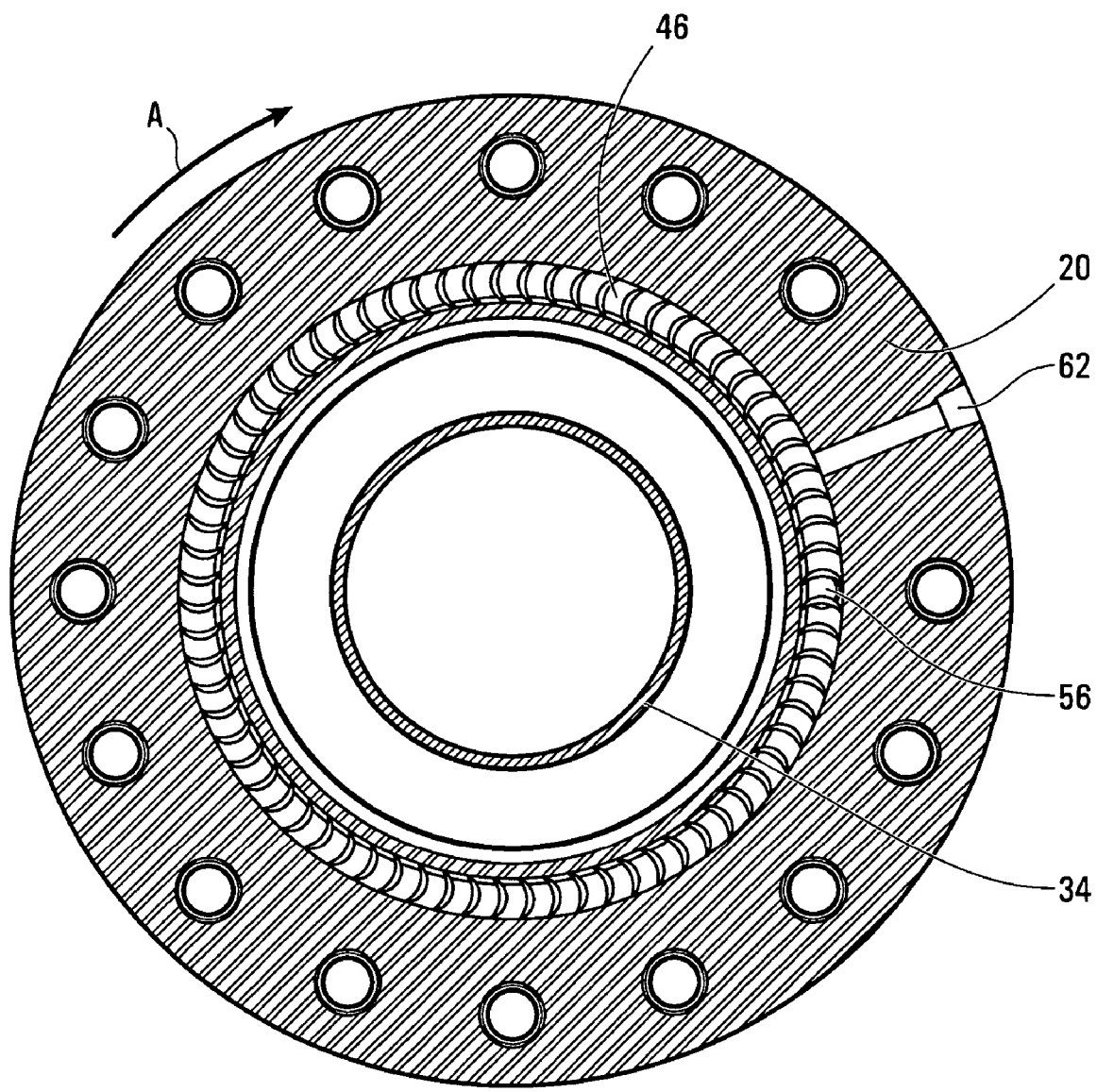
FIG. 3 is a top outlet cross-sectional view of the embodiment of FIG. 1.

Although the embodiment of FIGS. 1 to 3 is shown and described as vertically oriented, it will be understood that the gas compressor 10 can be oriented at an angle, such as 45° for slant wells, or oriented horizontally.

Figure 5:
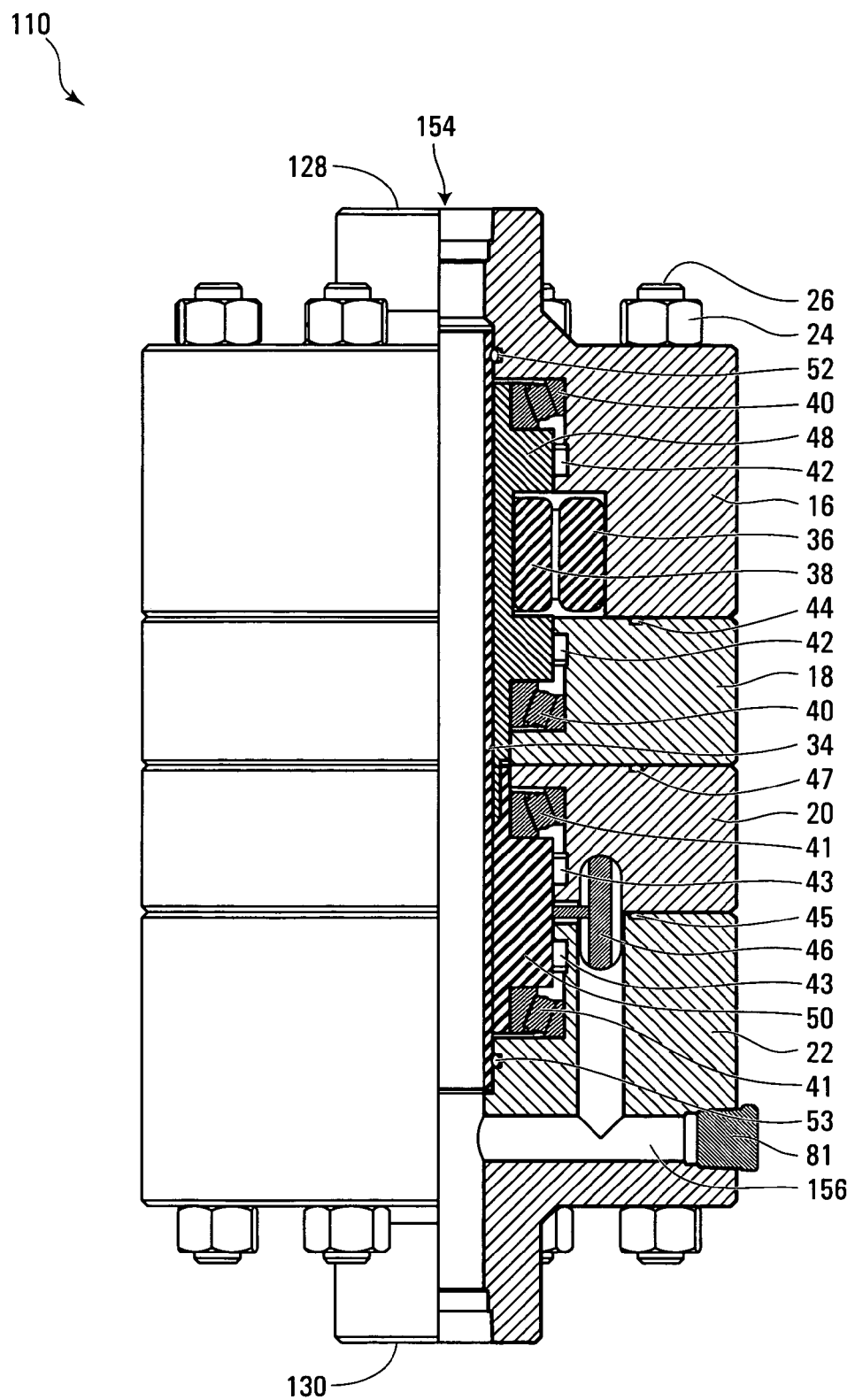
FIG. 5 is a side inlet partial sectional view of a second embodiment of the invention.

The configuration shown in FIG. 4 shows the compressor 10 as part of the wellhead assembly which allows full bore access to the casing. FIG. 5 shows an alternative embodiment of the invention. The reference characters in FIG. 5 indicate the same components as the reference characters in FIG. 1. A gas compressor 110 of FIG. 5 will be described only with respect to how it differs from the gas compressor 10 of FIG. 1. The gas compressor 110 of FIG. 5 is intended to be positioned in the casing line 90 (see FIG. 6) which extends from the annular space rather than being positioned on the casing head. Accordingly, the gas compressor 110 is sized smaller than the compressor 10 of FIG. 1. The through bore 154 of the gas compressor 110 has a smaller inside diameter than the through bore 54 of the gas compressor 10. The diameter of the through bore 154 is sized to match the size of the casing line at the wellhead. The top end 128 and the bottom end 130 of the gas compressor 110 (as oriented in FIG. 5) are not flanged. Instead, they are internally threaded for mating with the casing line. However, they can alternatively be flanged.

The gas compressor 110 includes an inlet 156. The inlet 156 is not angled in the manner of the inlet 56 of FIG. 1. Instead, the inlet 156 first extends perpendicular to the through bore 154 and then extends vertically upward as seen in FIG. 5. For manufacturing reasons, the horizontal portion of the inlet 156 is drilled from the exterior of the gas compressor 110 and then the exterior outlet is plugged with a plug 81.

Figure 6:
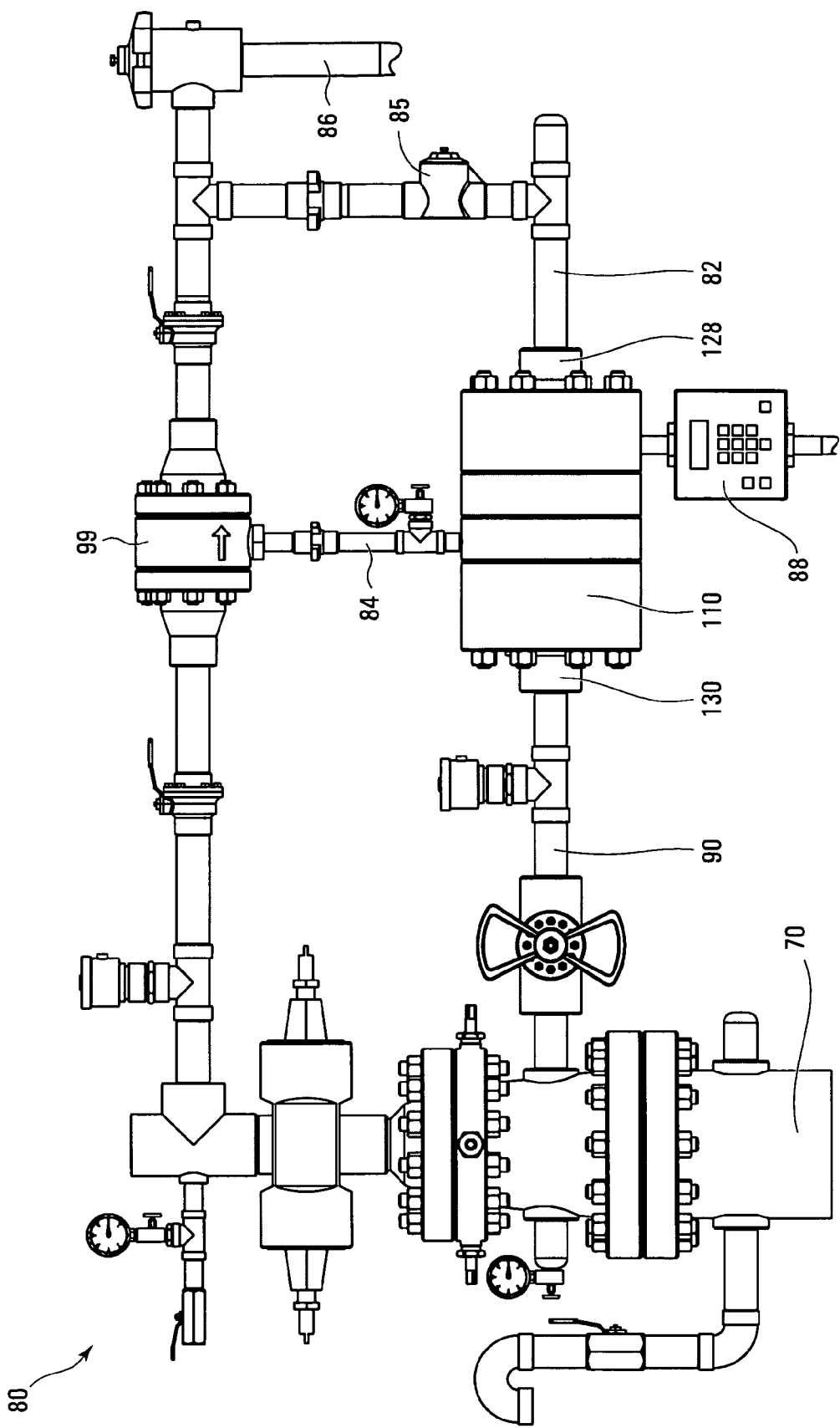
FIG. 6 is a schematic view of the embodiment of FIG. 5 shown as part of a wellhead assembly.

FIG. 6 can be contrasted to FIG. 4 with regard to the positioning of the gas compressor 110. In FIG. 6, the gas compressor 110 is not aligned with the casing head 70. Instead, the gas compressor 110 is positioned in the casing line 90 and connected at ends 130 and 128. The gas compressor 110 is shown as horizontally oriented for illustration. The gas compressor 110 can operate at any angle. The gas outlet of the gas compressor 110 connects to a gas flow line 84. The through bore 154 connects the flow line 82 to the annular space to allow the pumping of production stimulation fluids into the annular space. As with the system of FIG. 4, the gas and production fluid can be recombined in the main flow line 86 through the jet pump 99. A check valve 85 provides a control to, for example, allow production stimulation fluids through the flow line 82 but to prevent the fluid in the main flow line 86 from entering the flow line 82.

FIG. 6 also shows the variable frequency drive controller 88 which supplies power to the power section of the gas compressors.

Both the first and second embodiments show a compact gas compressor which can be integrated into the wellhead assembly for minimal footprint. The compressor advantageously may have the impeller and the rotor rotating about a conduit resulting in a compressor which is substantially uniformly distributed around the conduit. The conduit allows access to the annular space.

As can be seen from the figures, gas compressors 10 and 110 are modular, with separate and distinct power and compressor section. This enables multiple compressor modules to be powered by a single power section for increased compression. Also, power sections can be interchanged.

Figure 7:
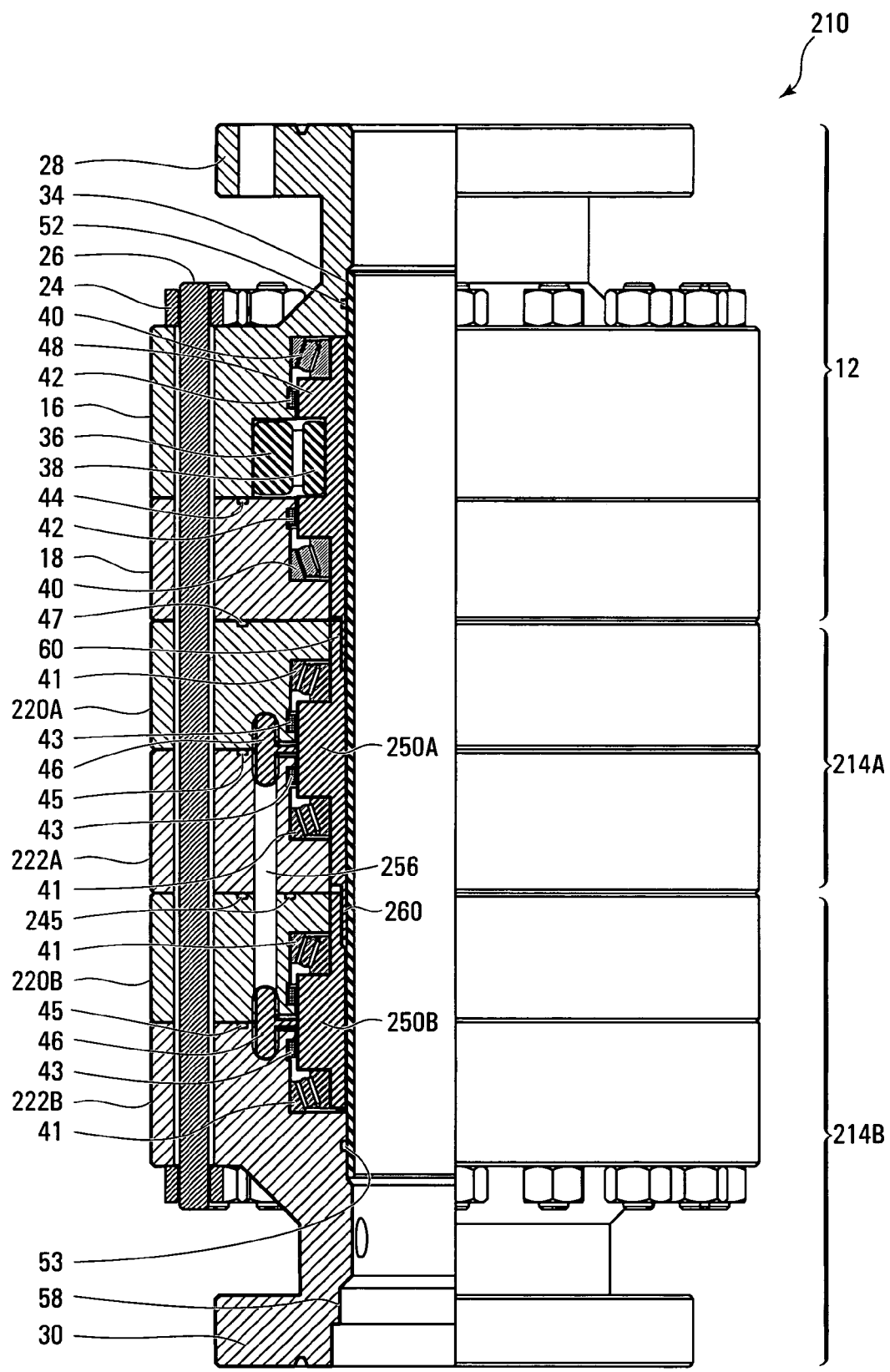
FIG. 7 is a side partial section view of the a third embodiment of the invention.

FIG. 7 shows an embodiment of the invention with two compressor modules. The reference characters in FIG. 7 indicate the same components as the reference characters in FIG. 1. A gas compressor 210 of FIG. 7 will be described only with respect to how it differs from the gas compressor 10 of FIG. 1. The gas compressor 210 of FIG. 7 includes a first compressor section 214A and a second compressor section 214B. Each of the first and second compressor sections 214A, 214B has two housing components, upper housing components 220A, 220B and lower housing components 222A, 222B, respectively. The second compressor section 214B has an input 56 (not shown) as depicted in FIG. 1. The second compressor section 214B does not have an outlet 62 as shown in FIG. 2. The first compressor section 214A has an outlet 62 (not shown) as depicted in FIG. 2. However, the first compressor section 214A does not have an inlet 56 as shown in FIG. 1. The outlet from the second compressor section 214B is a conduit 256. The conduit 256 is also the inlet to the first compressor section 214A.

The first compressor section 214A includes a first compressor mandrel 250A. The second compressor section 214B includes a second compressor mandrel 250B. The first compressor mandrel 250A is connected to the power mandrel 48 through the splines 60 as described with respect to FIG. 1. The first compressor mandrel 250A is connected to the second compressor mandrel 250B by splines 260.

Seals 245 are positioned around the conduit 256 between the first compressor section 214A and the second compressor section 214B to prevent gas leakage from the conduit 256. The conduit 256 extends between the circumferential space defined around the impellers 46 of the compressor sections 214A, 214B. In operation, the power section 12 provides power which rotates the power mandrel 48 and consequently the first compressor mandrel 250A and second compressor mandrel 250B. Gas enters the compressor 210 through the inlet 56 (not shown). The gas is accelerated by the impeller 46 of the second compressor section 214B and then exits the second compressor section 214B through the conduit 256. Gas enters the first compressor section 214A through the conduit 256 to the circumferential space and is accelerated by the impellers 46 of the first compressor section 214A and exits the compressor 210 via the outlet 62 (not shown) from the first compressor section 214A. Thus, FIG. 7 shows two compressor sections which act on the gas rather than a single compressor section as shown in FIG. 1. With minor adaptations additional compressor sections may be added. Since the power section is also modular, the power section may also be replaced.

The motor shown in the embodiments is an electric motor. However, other powering systems, including hydraulic systems may alternatively be used. The impeller shown is a circumferential impeller system, however, alternative compressing systems may also be used such as short stroke piston type compressors.

The orientation of the inlet and the positioning of various seals are preferred but not essential to invention.

Other types of bearings may be used throughout the pump.

Numerous modifications and variations of the present invention are possible in light of the above teachings. It is therefore to be understood that within the scope of the appended claims, the invention may be practiced otherwise than as specifically described herein.

The invention claimed is:

1. A pump for pumping fluid, comprising:
a pump housing having a first end and a second end;
a fluid inlet opening in the first end and a fluid outlet opening in the second end;
a stationary conduit extending through the pump housing from the fluid inlet opening to the fluid outlet opening;
an impeller that is separate from the stationary conduit and positioned to rotate about the stationary conduit externally of the stationary conduit and having a plurality of portions which are arranged to act on fluid at different positions about the stationary conduit;
a motor coupled to the impeller and positioned externally of the stationary conduit, the motor including a rotor positioned to rotate about the stationary conduit;
an inlet channel for introducing fluid from the stationary conduit to the fluid displacer to be pumped by the plurality of portions; and
an outlet channel for directing pumped fluid from the impeller;
wherein the stationary conduit is in fluid communication with the fluid inlet opening and the fluid outlet opening; and
wherein the stationary conduit extends past the impeller.

2. The pump according to claim 1 wherein the pumped fluid is directed external to the stationary conduit.

3. The pump according to claim 1 wherein the impeller is substantially uniformly distributed around the conduit.

4. The pump according to claim 1 wherein the stationary conduit comprises a central bore.

5. The pump according to claim 1 further comprising a sleeve defining at least part of the stationary conduit and separating the stationary conduit from the impeller.

6. The pump according to claim 4 wherein the pump is adapted to mate with a wellhead casing and the central bore comprises a segment of the wellhead casing.

7. The pump according to claim 4 wherein the pump is adapted to mate with a pipeline and the central bore comprises a segment of the pipeline.

8. A pump for pumping fluid, comprising:
a pump housing having a first end and a second end;
a fluid inlet opening in the first end and a fluid outlet opening in the second end;
a conduit extending through the pump housing from the fluid inlet opening to the fluid outlet opening;
a fluid displacer that is separate from the conduit and positioned externally of the conduit and having a plurality of portions which are arranged to act on fluid at different positions about the conduit;
a motor coupled to the fluid displacer and positioned externally of the conduit, the motor including a rotor positioned to rotate about the conduit;
an inlet channel for introducing fluid from the conduit to the fluid displacer to be pumped by the plurality of portions; and
an outlet channel for directing pumped fluid from the fluid displacer;
wherein the conduit is in fluid communication with the fluid inlet opening and the fluid outlet opening; and
wherein the conduit extends past the fluid displacer.

9. The pump according to claim 8 wherein the motor is directly coupled to the fluid displacer.

* * * * *